(12) United States Patent
Liang et al.

(10) Patent No.: US 12,548,692 B2
(45) Date of Patent: Feb. 10, 2026

(54) CONDUCTIVE WIRE, CONDUCTIVE COIL, AND CONDUCTIVE DEVICE

(71) Applicant: GOERTEK INC., Shandong (CN)

(72) Inventors: He Liang, Shandong (CN); Minghui Shao, Shandong (CN)

(73) Assignee: GOERTEK INC., Weifang (CN)

( * ) Notice: Subject to any disclaimer, the term of this patent is extended or adjusted under 35 U.S.C. 154(b) by 355 days.

(21) Appl. No.: 18/251,080

(22) PCT Filed: Dec. 16, 2020

(86) PCT No.: PCT/CN2020/136634
§ 371 (c)(1),
(2) Date: Apr. 28, 2023

(87) PCT Pub. No.: WO2022/088426
PCT Pub. Date: May 5, 2022

(65) Prior Publication Data
US 2023/0411041 A1    Dec. 21, 2023

(30) Foreign Application Priority Data
Oct. 30, 2020 (CN) .......................... 202011196961.6

(51) Int. Cl.
*H01B 7/42* (2006.01)
*H01F 27/28* (2006.01)
*H01F 5/00* (2006.01)

(52) U.S. Cl.
CPC ......... *H01B 7/428* (2013.01); *H01F 27/2876* (2013.01); *H01F 5/00* (2013.01)

(58) Field of Classification Search
None
See application file for complete search history.

(56) References Cited

U.S. PATENT DOCUMENTS

| | | | | |
|---|---|---|---|---|
| 1,854,474 | A | * 4/1932 | William | ................. H04R 21/02 381/180 |
| 2002/0157702 | A1 | * 10/2002 | Cordaro | .................. H10F 71/00 438/98 |

(Continued)

FOREIGN PATENT DOCUMENTS

| CN | 105504684 A | 4/2016 |
|---|---|---|
| CN | 106653164 A | 5/2017 |

(Continued)

OTHER PUBLICATIONS

International Search Report from International Application No. PCT/CN2020/136634 mailed Jul. 28, 2021.

*Primary Examiner* — Krystal Robinson
(74) *Attorney, Agent, or Firm* — Shih IP Law Group, PLLC

(57) ABSTRACT

The present disclosure discloses a conductive wire, a conductive coil, and a conductive device, wherein in the conductive wire, a metal oxide-coated carbon material is added to a first paint layer, and a silver-coated carbon material is added to a second paint layer. By means of such an arrangement, the coefficient of thermal conductivity of the first paint layer and the second paint layer reaches 2 to 10 W/(m·K), and therefore, the thermal conduction performance of the conductive wire can be remarkably improved, and the thermal conduction wire has an advantage of a good thermal conduction effect, with timely heat dissipation.

12 Claims, 1 Drawing Sheet

(56) References Cited

U.S. PATENT DOCUMENTS

| | | | | |
|---|---|---|---|---|
| 2003/0138698 A1* | 7/2003 | Lee | ................... | C04B 35/62842 |
| | | | | 427/113 |
| 2019/0148037 A1* | 5/2019 | Leach | ....................... | H02K 3/22 |
| | | | | 174/120 R |
| 2023/0386707 A1* | 11/2023 | Liang | ................ | H01B 13/0036 |

FOREIGN PATENT DOCUMENTS

| | | | | | |
|---|---|---|---|---|---|
| CN | 107892784 | A | | 4/2018 | |
| CN | 108102144 | A | | 6/2018 | |
| CN | 109300618 | A | | 2/2019 | |
| CN | 109599208 | A | | 4/2019 | |
| CN | 210837239 | U | | 6/2020 | |
| JP | 2006057017 | A | | 3/2006 | |
| KR | 20140024561 | A | * | 3/2014 | ............... H01B 1/02 |

* cited by examiner

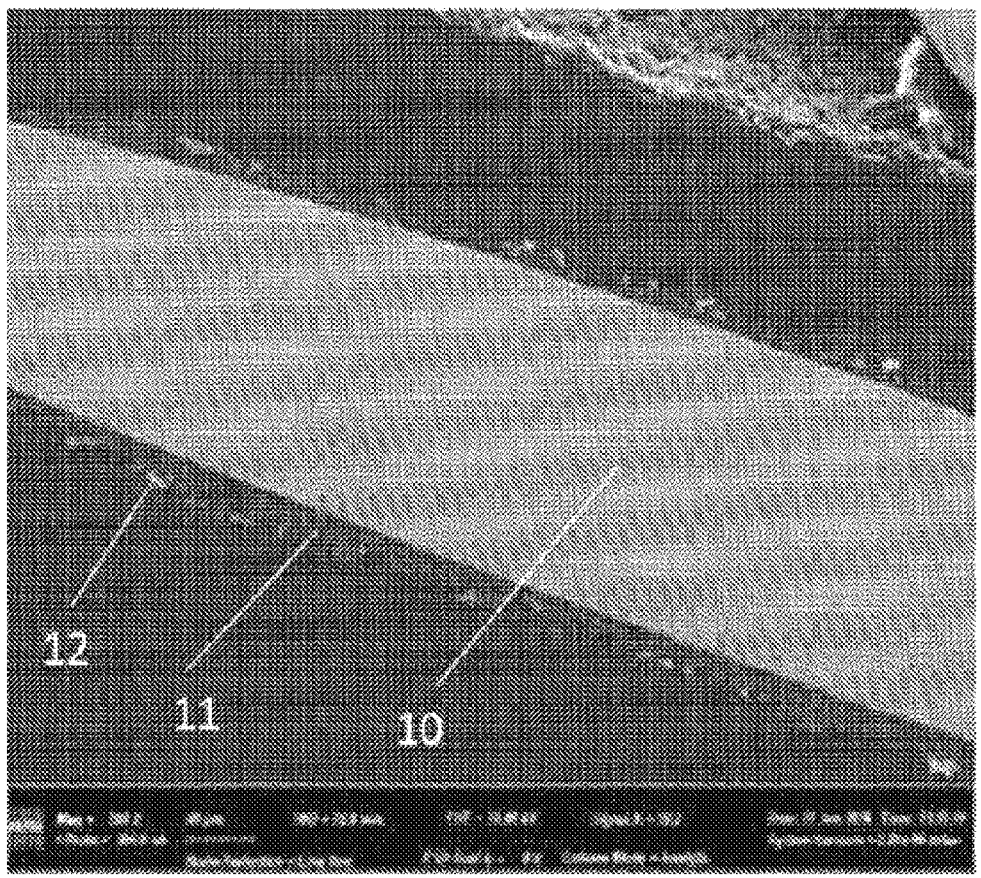

CONDUCTIVE WIRE, CONDUCTIVE COIL, AND CONDUCTIVE DEVICE

TECHNICAL FIELD

The present disclosure relates to the field of cable processing, in particular relates to a conductive wire, a conductive coil and a conductive device.

DESCRIPTION OF RELATED ART

For a long time, conductive wires are a main raw material for the manufacture of cables, wires, conductor materials, connection terminals and conversion terminals. With the development of modern industry, there are increasingly demanding in safety, high efficiency and energy saving of electrical and electronic devices, and electrical and electronic devices are showing a trend of miniaturization and light weight, however, the miniaturization and light weight of components inevitably lead to an increase in the temperature of their operation environment, and the conductive wires among coils of components that function to insulate also needs to increase the thermal conductive accordingly. However, in the existing conductive wires, in addition to low thermal conductivity of paint layers coated on a conductive core layer, a multi-layer winding arrangement causes the heat generated by the conductive wires to dissipate slowly, which seriously hinders the overall heat dissipation.

Therefore, providing a conductive wire with good thermal conduction performance has become a technical problem to be solved urgently in the art.

SUMMARY

A main object of the present disclosure is to provide a conductive wire, a conductive coil and a conductive device, aiming to solve the technical problem of poor thermal conduction performance of the conductive wire in the prior art.

The technical problem to be solved by the present disclosure is solved by the following technical solutions.

A conductive wire, which includes a conductive core layer, a first paint layer provided on an outer side of the conductive core layer, and a second paint layer provided on an outer side of the first paint layer; wherein, the first paint layer includes a metal oxide-coated carbon material therein, and the second paint layer includes a silver-coated carbon material therein.

Optionally, the metal oxide includes at least one of magnesium oxide, tin oxide, aluminum oxide, nickel oxide, cobalt oxide, manganese oxide, iron oxide, copper oxide, and zinc oxide, and the carbon material includes at least one of graphene, carbon nanotubes and carbon fibers.

Optionally, density of the metal oxide-coated carbon material is less than 1.5 g/cm3, and density of the silver-coated carbon material is less than 1.5 g/cm3.

Optionally, mass of the metal oxide-coated carbon material accounts for 40% to 85% of total mass of the first paint layer, and mass of the silver-coated carbon material accounts for 40% to 90% of total mass of the second paint layer.

Optionally, the metal oxide-coated carbon material and the silver-coated carbon material are both sheet-like structures, and maximum width of the sheet-like structures is between 100 nm and 10000 nm.

Optionally, coefficient of thermal conductivity of the first paint layer is 2 to 10 W/(m·K), coefficient of thermal conductivity of the second paint layer is 2 to 10 W/(m·K), and the coefficient of thermal conductivity of the second paint layer is not less than the coefficient of thermal conductivity of the first paint layer.

Optionally, carbon material in the first paint layer and carbon material in the second paint layer are the same or different.

Optionally, at least one of the first paint layer and the second paint layer is provided with a plurality of layers.

Optionally, the conductive wire further includes a nano-coating layer.

Optionally, the nano-coating layer has a thickness of 0.5 μm to 3 μm.

Optionally, the nano-coating layer is disposed between the conductive core layer and the first paint layer, and/or, the nano-coating layer is disposed between the first paint layer and the second paint layer.

In another aspect of the present disclosure, the present disclosure provides a coil, which is formed by winding the above-mentioned conductive wire.

In yet another aspect of the present disclosure, the present disclosure provides a device including the above-mentioned coil.

Optionally, the device includes at least one of an acoustic device, a wireless charging device, a motor device, and a mobile terminal device.

The present disclosure has following beneficial effects:

In the present disclosure, in the conductive wire, a metal oxide-coated carbon material is creatively added to the first paint layer, and a silver-coated carbon material is creatively added to the second paint layer. By means of such an arrangement, the coefficient of thermal conductivity of the first paint layer and the second paint layer reaches 2 to 10 W/(m·K), and therefore, the thermal conduction performance of the conductive wire can be remarkably improved, and the thermal conduction wire has an advantage of a good thermal conduction effect, with timely heat dissipation, thereby achieving unexpected technical effects.

BRIEF DESCRIPTION OF DRAWINGS

The accompanying drawings, which are incorporated in and constitute a part of the specification, illustrate embodiments of the present disclosure, and together with the description, serve to explain the principles of the present disclosure.

FIG. 1 is a scanning electron micrograph of the conductive wire of the first embodiment of the present disclosure.

EXPLANATION OF REFERENCE SIGNS

10: conductive core layer; 11: aluminum oxide-coated graphene; 12: silver-coated graphene.

DETAILED DESCRIPTIONS

Raw materials and devices used in the present disclosure, if not specified, are commonly used raw materials and devices in the art. Methods used in the present disclosure, if not specified, are conventional methods in the art.

Unless otherwise specified, meanings of the terms in this specification are the same as those generally understood by those skilled in the art, but if there is any conflict, the definitions in this specification shall prevail.

Herein, terms "comprise", "include", "contain", "including" and "having" or other variations thereof are intended to cover non-closed inclusions and no distinction is made between these terms. The term "include" means that other steps and components that do not affect the final result can be added. The term "include" also includes terms "consist of" and "essentially consist of". Compositions and methods/processes of the present disclosure include, consist of and essentially consist of the essential elements and limitation items described herein and any additional or optional compositions, components, steps or limitation items described herein.

All numerical values or expressions related to amounts of components, process conditions and the like used in the description and claims are to be understood as modified by "about" in all instances. All ranges related to the same component or property are inclusive of endpoints, which can be independently combined. Since these ranges are continuous, they include every value between the minimum value and maximum value. It should also be understood that any numerical range recited herein is intended to include all sub-ranges within that range.

As described in the background art, the conductive wires in the prior art have the problem of poor thermal conduction performance. In order to solve the above technical problem, the present disclosure provides a conductive wire, a conductive coil and a conductive device.

In a first aspect, the present disclosure provides a conductive wire, the conductive wire includes a conductive core layer, a first paint layer provided on an outer side of the conductive core layer, and a second paint layer provided on an outer side of the first paint layer; wherein, the first paint layer includes a metal oxide-coated carbon material, and the second paint layer includes a silver-coated carbon material.

The coefficient of thermal conductivity of the first paint layer and the second paint layer used in the existing conductive wires is low, generally 0.2 W/(m·K) or less, and the thermal conduction performance of the conductive wire is not good. Although adding materials having high thermal conductivity to the first paint layer and the second paint layer can theoretically improve the thermal conductivity of the conductive wire, the inventors have found that not all materials having high thermal conductivity can improve the thermal conductivity of the conductive wire when they are added into the first paint layer and the second paint layer. For example, the coefficient of thermal conductivity of AlN is high and theoretical value thereof reaches 319 W/(m·K), but the thermal conduction performance of the conductive wire obtained after adding AlN to the first paint layer and the second paint layer respectively is not good, which is a technical problem that those skilled in the art have never realized before. After extensive and profound research, the inventors found that carbon nanomaterials mainly include graphene, carbon nanotubes and carbon nanofibers, which are quasi-two-dimensional and one-dimensional carbon nanocrystal materials composed of sp2 hybridized carbon atoms, and which have high electrical performance and thermal conduction performance. By adding carbon materials into the first paint layer and the second paint layer, the coefficient of thermal conductivity of the first paint layer and the second paint layer can be greatly improved, and the thermal conduction performance of the conductive wire can be significantly improved.

However, since carbon materials have high electrical and thermal conduction performances while the first paint layer in the conductive wire functions the effect of insulation, it is difficult for the existing first paint layer to have both insulation and thermal conductivity, and therefore, there are few reports that carbon materials are used in the first paint layer of conductive wires. In the present disclosure, the metal oxide is coated on a surface of the carbon material, and the metal oxide and the carbon material cooperate with each other and function synergistically, so that the carbon material coated with the metal oxide has both insulation and good thermal conductivity. Here, an addition amount of carbon material in the first paint layer can be greatly increased, a heat conduction network chain can be formed to the greatest extent while maintaining insulation, and therefore significantly improve the thermal conductivity thereof.

In the present disclosure, the metal oxide has electrical insulation and good thermal conductivity, and when the metal oxide is coated on the surface of the carbon material, the metal oxide may cooperate with the carbon material, and provide the carbon material with insulating property while further improving the thermal conduction performance of the first paint layer, so that the first paint layer has high thermal conductivity, and in the meanwhile has electrical insulation, so as to solve the problem that the existing first paint layer is not easy to have both insulation and thermal conductivity.

As for coils wound by conductive wires, the coils can be bonded together by simple heating, the heating temperature usually needs up to 500° C. The inventors have found in their practice that, when a carbon material is directly added to the second paint layer, the carbon material may undergo high-temperature oxidation, thereby reducing the thermal conductivity of the carbon material and the adhesion of the second paint layer, resulting in a poor adhesion effect of the second paint layer. This is a technical problem which have not yet realized by those skilled in the art. In order to solve the above problem, in the present disclosure, silver is coated on the surface of carbon material. The present disclosure combines the advantages of the carbon material and silver, to overcome shortcomings thereof, so that the carbon material and silver cooperate with each other, in this way, on the one hand, high-temperature oxidation of carbon material can be prevented and the adhesion effect of the second paint layer after being coated can be effectively improved, on the other hand, the thermal conductivity and electrical conductivity of the second paint layer can be significantly improved, and furthermore, the problem that silver is easy to migrate is solved, such that silver and the carbon material are combined firmly while the dispersion of carbon material is increased.

Conductive Core Layer

In the present disclosure, the main function of the conductive core layer is to conduct electricity.

The material of the conductive core layer is not particularly limited in the present disclosure, and the materials of conductive core layers commonly used for conductive wires well-known to those skilled in the art can be used. As an example, the material of the conductive core layer may be but not limited to metal materials such as copper, aluminum, gold, silver, nickel and the like.

First Paint Layer

In the present disclosure, the first paint layer functions the effect of insulation, so as to ensure the insulation performance of the conductive wire, and improve the safety of the conductive wire in use.

In the present disclosure, the raw materials of the first paint layer include insulating paint raw materials and a metal oxide-coated carbon material added therein, and the first paint layer has a good insulating effect.

The composition of the insulating paint raw materials is not particularly limited in the present disclosure, and insulating paint raw materials commonly used for conductive wires well-known to those skilled in the art can be used. As an example, the insulating paint raw materials include polyurethane and the like.

The mass of the metal oxide-coated carbon material accounts for 40% to 85% of the total mass of the first paint layer, for example, accounts for 40%, 45%, 50%, 55%, 60%, 65%, 70%, 80% %, 85%, and any value between them.

In the present disclosure, the first paint layer may be a single layer or multiple layers.

The coefficient of thermal conductivity of the first paint layer is 2 to 10 W/(m·K), for example, 2 W/(m·K), 3 W/(m·K), 4 W/(m·K), 5 W/(m·K) K), 6 W/(m·K), 7 W/(m·K), 8 W/(m·K), 9 W/(m·K), 10 W/(m·K), and any value between them.

Metal Oxide-Coated Carbon Material

In the present disclosure, the carbon material in the metal oxide-coated carbon material includes at least one of graphene, carbon nanotubes, and carbon fibers, but is not limited thereto, and may also be other materials not listed in the embodiment but well known by those skilled in the art.

In the present disclosure, the metal oxide includes at least one of magnesium oxide, tin oxide, aluminum oxide, nickel oxide, cobalt oxide, manganese oxide, iron oxide, copper oxide, and zinc oxide, but it is not limited thereto, and may also be other metal oxides not listed in the embodiment but well known by those skilled in the art.

It should be noted that the metal oxide-coated carbon material may be a single component, and the metal oxide-coated carbon material may also be a mixed component. As an example, the metal oxide-coated carbon material may be aluminum oxide-coated graphene and iron oxide-coated graphene.

The metal oxide-coated carbon material is a sheet-like structure. The inventors found in research that the structure of the metal oxide-coated carbon material has an important influence on the thermal conductivity of the conductive wire, and the metal oxide-coated carbon material having a granular structure may affect the improvement of the thermal conductivity of the conductive wire. However, in the present disclosure, the metal oxide-coated carbon material having a sheet-like structure is conducive to the metal oxide-coated carbon materials to connect into a network with each other to form a heat dissipation channel, and thereby can significantly improve the thermal conductivity of the conductive wire.

In the present disclosure, the maximum width of the sheet-like structure of the metal oxide-coated carbon material is between 100 nm and 10000 nm. If the sheet-like structure has a too small size, the metal oxide-coated carbon materials are not easy to be connected into a three-dimensional channel; if the sheet-like structure has a too large size, it may exceed the thickness of the paint layer.

The density of the metal oxide-coated carbon material is less than 1.5 g/cm3. With this arrangement, the added metal oxide-coated carbon materials are easy to be dispersed in the insulating paint raw materials without precipitation.

Second Paint Layer

In the present disclosure, the second paint layer is mainly used to meet the requirements for a coil forming process, functions a bonding effect, and functions to protect and strengthen the first paint layer. As for the coils wound by the conductive wires, the coil can be bonded together by simple heating.

In the present disclosure, the raw materials of the second paint layer include self-adhesive paint raw materials and a silver-coated carbon material added therein, the second paint layer has viscosity under heating conditions, and obtains structural strength after curing, so that the coil can be formed firmly.

The composition of the self-adhesive paint raw materials is not particularly limited in the present disclosure, and the self-adhesive paint raw materials commonly used for conductive wires well-known to those skilled in the art can be used. As an example, the self-adhesive paint raw materials include polyamide and the like.

The silver-coated carbon material accounts for 40% to 90% of the total mass of the second paint layer, for example, 40%, 45%, 50%, 55%, 60%, 65%, 70%, 80%, 90% and any value between them.

The second paint layer may be a single layer or multiple layers.

It should be noted that the carbon materials used in the metal oxide-coated carbon material and the carbon materials used in the silver-coated carbon material may be the same or different.

The coefficient of thermal conductivity of the second paint layer is 2 to 10 W/(m·K), for example, 2 W/(m·K), 3 W/(m·K), 4 W/(m·K), 5 W/(m·K) K), 6 W/(m·K), 7 W/(m·K), 8 W/(m·K), 9 W/(m·K), 10 W/(m·K), and any value between them.

The thermal conductivity of the second paint layer is not less than the thermal conductivity of the first paint layer.

Silver-Coated Carbon Material

In the present disclosure, the carbon material in the silver-coated carbon material includes at least one of graphene, carbon nanotubes, and carbon fibers, but is not limited thereto, and may also be other materials not listed in the embodiment but well known by those skilled in the art.

In the present disclosure, the manufacture method of the silver-coated carbon material is not particularly limited, and various manufacture methods well known to those skilled in the art can be used. As examples, chemical plating method, electroplating method, light radiation method and thermal decomposition method can be used.

It should be noted that the silver-coated carbon material may be a single component, or the silver-coated carbon material may be a mixed component. As an example, the silver-coated carbon material may be silver-coated graphene and silver-coated carbon fibers.

The silver-coated carbon material is a sheet-like structure. The inventors found in research that the structure of the silver-coated carbon material has an important influence on the thermal conductivity of the conductive wire, and the silver-coated carbon material having a granular structure may affect the improvement of the thermal conductivity of the conductive wire. However, in the present disclosure, the silver-coated carbon material having a sheet-like structure is conducive to the silver-coated carbon materials to connect into a network with each other to form a heat dissipation channel, and thereby can significantly improve the thermal conductivity of the conductive wire.

In the present disclosure, the maximum width of the sheet-like structure of the silver-coated carbon material is between 100 nm and 10000 nm. If the sheet-like structure has a too small size, the silver-coated carbon materials are not easy to be connected into a three-dimensional channel; if the sheet-like structure has a too large size, it may exceed the thickness of the paint layer.

The density of the silver-coated carbon material is less than 1.5 g/cm3. With this arrangement, the added silver-coated carbon materials are easily dispersed in the self-adhesive paint raw materials without precipitation.

Further, the conductive wire further includes a nano-coating layer. In the present disclosure, providing the nano-coating layer can further improve the thermal conductivity of the conductive wire.

In the present disclosure, the material of the nano-coating layer is not particularly limited, and nano-coating layer materials well-known to those skilled in the art can be used, as long as the nano-coating layer has good thermal conductivity and insulation. Preferably, the material of the nano-coating layer is silicon dioxide.

In the present disclosure, the nano-coating layer has a thickness of 0.5 μm to 3 μm, preferably 0.8 μm to 2 μm, more preferably 1 μm.

In the present disclosure, the nano-coating layer is arranged between the conductive core layer and the first paint layer, and/or, the nano-coating layer is arranged between the first paint layer and the second paint layer.

In a second aspect, the present disclosure provides a coil, which is formed by winding the conductive wire in the first aspect.

In a third aspect, the present disclosure provides a device, which includes the above-mentioned coil.

In the present disclosure, the type of the device is not particularly limited, and various devices that require coils, including but not limited to at least one of acoustic devices, wireless charging devices, motor devices, and mobile terminal devices, may be applied.

In order to better understand the above technical solutions, the above technical solutions will be described in detail below in conjunction with specific examples. The examples are only preferred embodiments of the present disclosure, and are not limitations of the present disclosure.

Example 1

A conductive wire, which includes a conductive core layer, a first paint layer provided on an outer side of the conductive core layer, and a second paint layer provided on an outer side of the first paint layer; wherein, the first paint layer includes aluminum oxide-coated graphene therein, and the second paint layer includes silver-coated graphene therein.

The density of the aluminum oxide-coated graphene is less than 1.5 g/cm3, and the density of the silver-coated graphene is less than 1.5 g/cm3.

The mass of the aluminum oxide-coated graphene accounts for 60% of the total mass of the first paint layer; the silver-coated graphene accounts for 50% of the total mass of the second paint layer.

The aluminum oxide-coated graphene and the silver-coated graphene are both sheet-like structures, and the maximum width of the sheet-like structures is between 100 nm and 10000 nm.

The coefficient of thermal conductivity of the first paint layer is 2 to 10 W/(m·K); the coefficient of thermal conductivity of the second paint layer is 2 to 10 W/(m·K); the coefficient of thermal conductivity of the second paint layer is not less than the coefficient of thermal conductivity of the first paint layer.

FIG. 1 is a scanning electron micrograph of the conductive wire of Example 1 of the present disclosure. It can be seen from FIG. 1 that the aluminum oxide-coated graphene and the silver-coated graphene are both sheet-like structures.

Example 2

A conductive wire, which includes a conductive core layer, a first paint layer provided on an outer side of the conductive core layer, and a second paint layer provided on an outer side of the first paint layer; wherein, the first paint layer includes iron oxide-coated carbon fibers therein, and the second paint layer includes silver-coated carbon nanotubes therein.

The density of the iron oxide-coated carbon fibers is less than 1.5 g/cm3, and the density of the silver-coated carbon nanotubes is less than 1.5 g/cm3.

The mass of the iron oxide-coated carbon fibers accounts for 40% of the total mass of the first paint layer; the mass of the silver-coated carbon nanotubes accounts for 90% of the total mass of the second paint layer.

The iron oxide-coated carbon fibers and the silver-coated carbon nanotubes are both sheet-like structures, and the maximum width of the sheet-like structures is between 100 nm and 10000 nm.

The coefficient of thermal conductivity of the first paint layer is 2 to 10 W/(m·K); the coefficient of thermal conductivity of the second paint layer is 2 to 10 W/(m·K); the coefficient of thermal conductivity of the second paint layer is not less than the coefficient of thermal conductivity of the first paint layer.

Example 3

A conductive wire, which includes a conductive core layer, a nano-coating layer provided on an outer side of the conductive core layer, a first paint layer provided on an outer side of the nano-coating layer, and a second paint layer provided on an outer side of the first paint layer; wherein, the first paint layer includes magnesium oxide-coated carbon nanotubes therein, and the second paint layer includes silver-coated graphene therein.

The density of the magnesium oxide-coated carbon nanotubes is less than 1.5 g/cm3, and the density of the silver-coated graphene is less than 1.5 g/cm3.

The mass of the magnesium oxide-coated carbon nanotubes accounts for 85% of the total mass of the first paint layer; the mass of the silver-coated graphene accounts for 40% of the total mass of the second paint layer.

The magnesium oxide-coated carbon nanotubes and the silver-coated graphene are both sheet-like structures, and the maximum width of the sheet-like structures is between 100 nm and 10000 nm.

The coefficient of thermal conductivity of the first paint layer is 2 to 10 W/(m·K); the coefficient of thermal conductivity of the second paint layer is 2 to W/(m·K); the coefficient of thermal conductivity of the second paint layer is not less than the coefficient of thermal conductivity of the first paint layer.

The thickness of the nano-coating layer is 1 μm, and the nano-coating layer is a silicon dioxide coating.

Example 4

A conductive wire, which includes a conductive core layer, a first paint layer provided on an outer side of the conductive core layer, a nano-coating layer provided on an outer side of the first paint layer, and a second paint layer provided on an outer side of the nano-coating layer; wherein, the first paint layer includes aluminum oxide-coated graphene therein, and the second paint layer includes silver-coated graphene therein.

The density of the aluminum oxide-coated graphene is less than 1.5 g/cm3, and the density of the silver-coated graphene is less than 1.5 g/cm3.

The mass of the aluminum oxide-coated graphene accounts for 50% of the total mass of the first paint layer; the mass of the silver-coated graphene accounts for 60% of the total mass of the second paint layer.

The aluminum oxide-coated graphene and the silver-coated graphene are both sheet-like structures, and the maximum width of the sheet-like structures is between 100 nm and 10000 nm.

The coefficient of thermal conductivity of the first paint layer is 2 to 10 W/(m·K); the coefficient of thermal conductivity of the second paint layer is 2 to 10 W/(m·K); the coefficient of thermal conductivity of the second paint layer is not less than the coefficient of thermal conductivity of the first paint layer.

The thickness of the nano-coating layer is 3 µm, and the nano-coating layer is a silicon dioxide coating.

Example 5

A conductive wire, which includes a conductive core layer, a nano-coating layer provided on an outer side of the conductive core layer, a first paint layer provided on an outer side of the nano-coating layer, a nano-coating layer provided on an outer side of the first paint layer, and a second paint layer provided on an outer side of the nano-coating layer; wherein, the first paint layer includes cobalt oxide-coated carbon fibers therein, and the second paint layer includes silver-coated carbon nanotubes therein.

The density of the cobalt oxide-coated carbon fibers is less than 1.5 g/cm3, and the density of the silver-coated carbon nanotubes is less than 1.5 g/cm3.

The mass of the cobalt oxide-coated carbon fibers accounts for 40% of the total mass of the first paint layer; the silver-coated carbon nanotubes accounts for 70% of the total mass of the second paint layer.

The metal oxide-coated carbon material and the silver-coated carbon material are both sheet-like structures, and the maximum width of the sheet-like structures is between 100 nm and 10000 nm.

The coefficient of thermal conductivity of the first paint layer is 2 to 10 W/(m·K); the coefficient of thermal conductivity of the second paint layer is 2 to W/(m·K); the coefficient of thermal conductivity of the second paint layer is not less than the coefficient of thermal conductivity of the first paint layer.

The nano-coating layer provided on the outer side of the conductive core layer has a thickness of 3 µm, and the nano-coating layer provided on the outer side of the first paint layer has a thickness of 0.5 µm.

Comparative Example 1

Comparative is different from Example 1 in that, in Comparative Example 1, the aluminum oxide-coated graphene is replaced by AlN, and the silver-coated graphene is replaced by AlN.

Comparative Example 2

Comparative Example 2 uses a commercially available conductive wire, wherein no high thermal conductivity material is added to the first paint layer, and no high thermal conductivity material is added to the second paint layer.

Comparative Example 3

Comparative example 3 is different from Example 1 in that, each of the aluminum oxide-coated graphene and the silver-coated graphene is granular structure.

Comparative Example 4

Comparative example 4 is different from Example 1, the aluminum oxide-coated graphene is replaced by graphene.

Comparative Example 5

Comparative example 5 is different from Example 1 in that, the silver-coated graphene is replaced by graphene.

In order to verify the performance of products of the present disclosure, coils made of the conductive wires in Examples 1-5 and coils made of Comparative Examples 1-5 were respectively tested for thermal conductivity performance. The specific method is as follows:

The conductive wires in Examples 1-5 and the conductive wires in Comparative Examples 1-5 are respectively used to form coils as loudspeaker voice coils, and temperature variations of the loudspeaker voice coils in use over time are measured. The unit of temperature of the loudspeaker voice coils is ° C. Taking 3 samples for each example for testing. The results are shown in Table 1 below.

TABLE 1

|  | 10 s | 20 s | 30 s | 40 s | 50 s | 100 s | 150 s | 200 s |
| --- | --- | --- | --- | --- | --- | --- | --- | --- |
| Example 1 | 54.97 | 67.28 | 76.31 | 80.07 | 81.52 | 82.18 | 82.51 | 82.51 |
| Example 2 | 55.49 | 67.01 | 75.39 | 79.04 | 79.92 | 80.70 | 81.35 | 81.35 |
| Example 3 | 57.52 | 68.78 | 77.04 | 80.32 | 81.55 | 81.74 | 81.96 | 81.96 |
| Example 4 | 53.44 | 64.63 | 73.06 | 76.36 | 77.54 | 77.61 | 77.97 | 77.97 |
| Example 5 | 53.67 | 65.37 | 73.16 | 76.88 | 78.21 | 78.57 | 79.06 | 79.06 |
| Comparative Example 1 | 60.45 | 85.88 | 96.9 | 101.48 | 103.37 | 104.78 | 104.86 | 104.86 |
| Comparative Example 2 | 61.79 | 88.92 | 100.6 | 105.48 | 107.67 | 109.65 | 109.78 | 109.78 |
| Comparative Example 3 | 58.37 | 83.37 | 94.37 | 99.2 | 101.33 | 102.49 | 102.72 | 102.72 |
| Comparative Example 4 | 59.28 | 83.12 | 93.06 | 97.34 | 99.09 | 99.76 | 100.07 | 100.07 |
| Comparative Example 5 | 60.13 | 84.68 | 94.49 | 98.53 | 100.2 | 101.47 | 101.63 | 101.63 |

As can be seen from Table 1, in the present disclosure, in the conductive wire, a metal oxide-coated carbon material is added in the first paint layer, and a silver-coated carbon material is added in the second paint layer. The metal oxide-coated carbon material and the silver-coated carbon material are both sheet-like structures. By means of such an arrangement, the thermal conduction performance of the conductive wire can be remarkably improved, and the thermal conduction wire has an advantage of a good thermal conduction effect, with timely heat dissipation, thereby unexpected technical effects are achieved.

The above-described embodiments only express the implementation manners of the present disclosure, and specific and detailed description is provided, but it should not be interpreted as limiting the scope of the patent of the present disclosure. All technical solutions obtained in the form of equivalent replacement or equivalent transformation shall fall within the protection scope of the present disclosure.

What is claimed is:

1. A conductive wire comprising: a conductive core layer; a first paint layer provided on an outer side of the conductive core layer; and a second paint layer provided on an outer side of the first paint layer, wherein, the first paint layer includes metal oxide-coated carbon material therein, and the second paint layer includes silver-coated carbon material therein, the mass of the metal oxide-coated carbon material accounts for 40% to 85% of total mass of the first paint layer, and mass of the silver-coated carbon material accounts for 40% to 90% of total mass of the second paint layer.

2. The conductive wire according to claim 1, wherein the metal oxide includes at least one of magnesium oxide, tin oxide, aluminum oxide, nickel oxide, cobalt oxide, manganese oxide, iron oxide, copper oxide and zinc oxide, and the carbon material includes at least one of graphene, carbon nanotubes and carbon fibers.

3. The conductive wire according to claim 1, wherein density of the metal oxide-coated carbon material is less than 1.5 g/cm$^3$, and density of the silver-coated carbon material is less than 1.5 g/cm$^3$.

4. The conductive wire according to claim 1, wherein each of the metal oxide-coated carbon material and the silver-coated carbon material has a sheet-like structure, and maximum width of the sheet-like structure is between 100 nm and 10000 nm.

5. The conductive wire according to claim 1, wherein coefficient of thermal conductivity of the first paint layer is 2 to 10 W/(m·K), coefficient of thermal conductivity of the second paint layer is 2 to 10 W/(m·K), and the coefficient of thermal conductivity of the second paint layer is not less than the thermal conductivity of the first paint layer.

6. The conductive wire according to claim 1, wherein the carbon material in the first paint layer and the carbon material in the second paint layer are the same or different.

7. The conductive wire according to claim 1, wherein the conductive wire further comprises a nano-coating layer.

8. The conductive wire according to claim 7, wherein the nano-coating layer has a thickness of 0.5 μm to 3 μm.

9. The conductive wire according to claim 7, wherein the nano-coating layer is disposed between the conductive core layer and the first paint layer, and/or the nano-coating layer is disposed between the first paint layer and the second paint layer.

10. A coil formed by winding the conductive wire according to claim 1.

11. A device comprising the coil according to claim 10.

12. The device according to claim 11, wherein the device comprises at least one of an acoustic device, a wireless charging device, a motor device, and a mobile terminal device.

* * * * *